July 5, 1949.　　　R. J. HORTON ET AL　　　2,475,322
COUPLING DEVICE FOR FLEXIBLE CONDUITS
Filed May 10, 1946
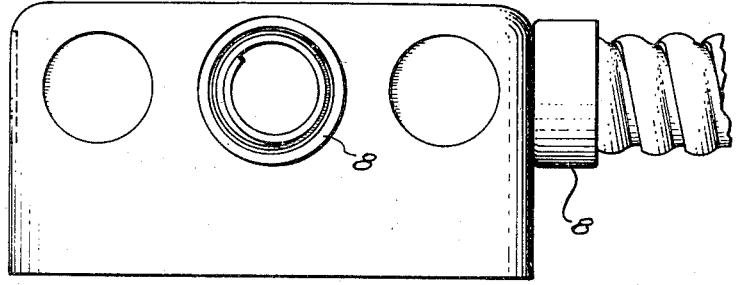
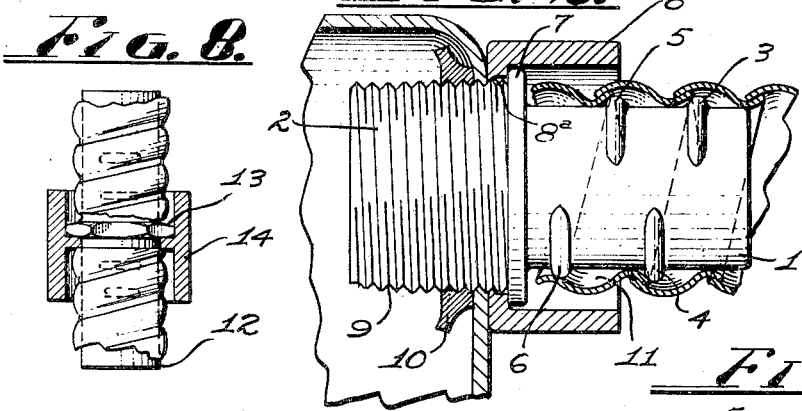
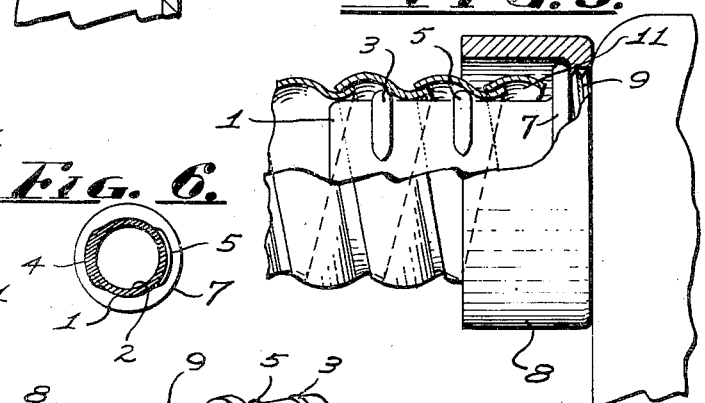
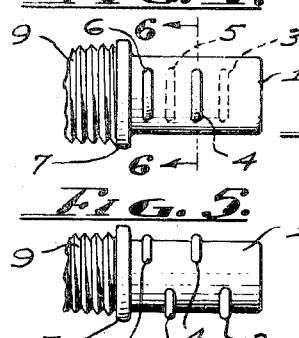
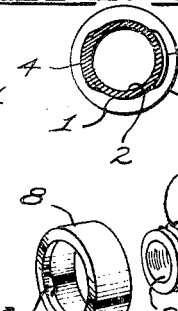
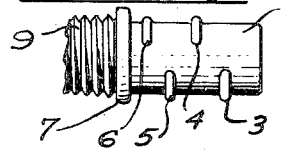
Inventor
RICHARD J. HORTON
HELEN F. BRYANE
By R. S. Burt
Attorney Patented July 5, 1949

2,475,322

UNITED STATES PATENT OFFICE 2,475,322

COUPLING DEVICE FOR FLEXIBLE CONDUITS

Richard J. Horton, Tujunga, and Helen F. Bryane, La Crescenta, Calif.

Application May 10, 1946, Serial No. 668,790

1 Claim. (Cl. 285—6.5)

This invention relates to an improved form of coupling for connecting the ends of flexible metallic conduits for electric conductors to junction boxes and the like. Such conduits are formed of a strip of resilient metal having a cross section of modified S-shaped contour with resultant interlocking of the side faces thereof when wound into a spiral.

It is an object of the invention to provide a coupling member for such conduits comprising a sleeve like member insertable in the conduit and engageable with the inner wall thereof, which sleeve employs the resiliency of the conduit metal as a means for securing it against removal therefrom and as a means for insuring a proper grounding of the conduit to the coupling.

Another object of the invention is to provide a coupling member for conduits of the above character which exerts an axially extending action between adjacent convolutions of the conduit with resultant improvement of the gripping action of such convolutions on the coupling.

A still further object of the invention is to provide a coupling for flexible conduits of the above character which tends upon application thereto to expand the underlying portions of the engaged convolutions against the overlying portions of adjacent convolutions of the conduit with resultant increase in the gripping power of the conduit on the coupling.

Still another object of the invention is to provide a coupling of the above character which is so designed as to threadedly engage the convolutions of the conduit for ease in assembly therewith.

A still further object of the invention is to provide a coupling of the above character insertable in a spirally wound flexible conduit which coupling is provided with a series of spaced conduit-engaging protuberances formed of a relatively soft, self lubricating type metal, whereby assembly into the end of a conduit is facilitated.

Still another object of the invention is to provide a coupling of the above character insertable into a spirally wound flexible conduit which coupling is provided with a series of axially and radially spaced convolution-engaging protuberances which are so arranged relative to one another as to define a helical angle which is different than the helical angle of the convolutions of the conduit to which it is to be applied.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a junction box showing the end of a flexible conduit attached thereto by means of the coupling of this invention, Fig. 2 is an enlarged transverse, sectional view of a portion of a junction box or the like and the connection thereto of one end of a flexible conduit by the coupling of this invention, Fig. 3 is a view similar to Fig. 2 but showing the application of the coupling to the opposite end of the conduit, Fig. 4 is a top plan view of the coupling shown in Figs. 2 and 3, Fig. 5 is a side elevation of the coupling shown in Fig. 4, Fig. 6 is a sectional view taken on the line 6—6 of Fig. 4, Fig. 7 is an exploded perspective view of the component parts of the coupling, and Fig. 8 shows a modified form of the invention particularly adapted to connect the adjacent ends of a pair of conduit sections.

Flexible conduits for electric conductors are customarily formed of a spirally wound strip of resilient metal which prior to winding is given a reverse curve or modified S-shaped formation so that upon winding the inturned edge portion will be interlocked with the outturned edge portion and with the formation, interiorly of the conduit of a spiral space of greater radius than the radius of the minimum inside dimension of the conduit. The coupling member of this invention comprises a cylindrical sleeve 1 having an outer diameter which is approximately the same as the minor interior diameter of the conduit and having an inner diameter 2 sufficiently large to accommodate the wire or wires disposed in the conduit. Disposed on the outer surface of the sleeve 1 is a series of protuberances 3, 4, 5 and 6 in the form of ribs extending for short distances on the sleeve in a direction at right angles to the axis of the sleeve. In the illustrated embodiment, these protuberances are disposed in groups, diametrically opposite groups, the protuberances 3 and 5 constituting one group and protuberances 4 and 6 constituting the other group. In each group the individual protuberances are axially spaced apart a distance which is slightly greater than the pitch of the thread represented by the spiral groove interiorly of the conduit. The oppositely disposed protuberances are axially spaced so as to lie in planes normal to the axis of the sleeve 1 which are midway between parallel planes intersecting the first group. Thus upon assembly, each of at least two convolutions of the conduit will be engaged by at least two of said protuberances.

The coupling member intermediate its ends, is provided with a radially extending flange 7 one side of which serves as an abutment for the end of a conduit into which the coupling is inserted and the other side of which serves as an abutment for the face of a junction box to which the coupling is to be connected or for a shield 8 adapted to be spaced from and to overlie the end of the coupling to conceal any rough edges on the end of the conduit and to prevent them engaging the hands or clothing of persons working around the point of connection. Additionally, such a shield makes a neat appearing joint between the conduit and the object to which it is attached. Opposite the conduit engaging end, the coupling is provided with suitable means for attaching it to the wall of a junction box or the like such as the threaded portion 9 adapted to be engaged by a nut 10 as most clearly shown in Figs. 2 and 3. Also, if desired, the shield 8 may be provided with thread engaging lugs 8a to facilitate assembly of the coupling to the junction box or the like to which the conduit is to be connected.

While this is preferred form of connection, it will be understood that other forms of fastening the coupling to the object to which the conduit is to be connected may also be employed.

In attachment to a conduit the end of the sleeve 1 is first inserted into the conduit and the sleeve or conduit is then rotated relative to the other in a direction to cause the protuberance 3 to engage the spiral groove 11 on the interior of the conduit. Continued rotation will then cause the sleeve to be drawn into the conduit with successive engagement of the groove 11 by the protuberances 4, 5 and 6 until the end of the conduit engages the face of the flange 7. Since these protuberances are so spaced relative to each other as to successively define a spiral having a slightly greater helical angle than the spiral groove 11, the interengaging edges of the conduit strip will be extended slightly with respect to each other axially of the conduit and effect a firm engagement with each other and with the coupling sleeve. Additionally, it is to be noted that the direction of rotation of the sleeve or conduit incident to assembly is such that the frictional engagement between the protuberances and the interior of the conduit will tend to unwind the conduit with incident slight enlargement of the diameter thereof whereby, since it is formed of resilient material, a further firm gripping engagement between the sleeve and coupling is achieved. Still further it is to be noted that this unwinding tendency will facilitate assembly and that upon attempt to remove the coupling, the frictional engagement will tend to cause the coupling to be gripped still tighter since the rotation will then be in a direction tending to wind up the spiral of the conduit. As hereinbefore stated, the conduit engaging protuberances on the sleeve are preferably formed of a soft metal having self lubricating characteristics to facilitate assembly and as a practical matter it is advantageous to form the entire coupling of such material. This choice of material is advantageous for still another reason in that incident to assembly a good electrical connection between the conduit and coupling is effected by the slight abrading effect of the conduit on the protuberances engaged thereby and the engagement of the coupling with the junction box or other object to which the conduit is attached will effect a satisfactory grounding connection. Further, the choice of a soft metal makes it possible to form the coupling by die casting with the advantages of low manufacturing cost and uniformity of product.

Referring to Fig. 8 there is shown a coupling 12 having similar conduit-engaging ends with a radial flange 13 disposed between them which is useful in interconnecting the ends of a pair of conduits by insertion therein in the manner above described. If desired, a shielding element such as shown at 14 may also be employed with this form or a pair of shielding elements similar to the shield 8 may be used. In either case, the shield would be placed on the coupling prior to its insertion in the conduit and it would be held in place by engagement between the end of the conduit and the flange 13. Additionally, it will be appreciated that adjacent ends of conduits may be joined by interconnecting the threaded ends of a pair of couplings such as shown in Figs. 1 to 7 by means of a union nut if desired.

Thus there is provided a coupling for attaching the end of a flexible conduit to a junction box or the like which is of simple design and which utilizes the inherent resilience of the material forming the conduit to permit ease of assembly, to effect a rigid self-locking assembly and to simultaneously effect a satisfactory electrical grounding connection between the conduit and the object to which it is to be attached and one which can be used with existing electrical apparatus and the like.

While we have shown and described a specific embodiment of our invention, we do not limit ourselves to the exact details of construction set forth, and the invention embraces such changes, modifications and equivalents of the parts and their formation and arrangement as come within the purview of the appended claim.

We claim:

In a coupling for spirally wound, flexible conduits, a tubular member having means at one end adapted to be affixed to the wall of a junction box or the like, the other end of said coupling being insertable within the end of a conduit and having a series of ribs extending substantially at right angles to the major axis of said tubular member and adapted to engage the convolutions of the conduit, said ribs being sequentially disposed in staggered relation along the outer surface of the conduit-engaging portion of said coupling so as to define a spiral having a greater helical angle than the normal helical angle of the convolutions of the conduit.

RICHARD J. HORTON.
HELEN F. BRYANE.

REFERENCES CITED

The following references are of record in the file of this patent:

UNITED STATES PATENTS

| Number | Name | Date |
| --- | --- | --- |
| 1,494,524 | Adamson | May 20, 1924 |
| 1,629,058 | Wilson | May 17, 1927 |
| 1,775,128 | Hunter | Sept. 9, 1930 |
| 1,830,250 | Tiefenbacher | Nov. 3, 1931 |
| 1,973,170 | Jacobi | Sept. 11, 1934 |

FOREIGN PATENTS

| Number | Country | Date |
| --- | --- | --- |
| 22,310 | Great Britain | 1910 |